Dec. 23, 1941.                H. F. MORLEY ET AL                2,267,504
                    SPEED AND BRAKING DISTANCE INDICATOR
                         Filed Feb. 5, 1940          2 Sheets-Sheet 1

INVENTORS.
Herbert F. Morley,
Roy E. Gearhart.
BY
Hovey F. Hamilton,
ATTORNEYS.

Dec. 23, 1941.   H. F. MORLEY ET AL   2,267,504
SPEED AND BRAKING DISTANCE INDICATOR
Filed Feb. 5, 1940    2 Sheets-Sheet 2

INVENTORS,
Herbert F. Morley,
Roy E. Gearhart.
BY Hovey & Hamilton,
ATTORNEYS.

Patented Dec. 23, 1941

2,267,504

UNITED STATES PATENT OFFICE 2,267,504

SPEED AND BRAKING DISTANCE INDICATOR

Herbert F. Morley and Roy E. Gearhart,
Kansas City, Mo.

Application February 5, 1940, Serial No. 317,332

10 Claims. (Cl. 73—51)

This invention relates to improvements in speed and braking distance indicators and particularly, to a device whereby the distance required to stop a car from an indicated speed of travel is indicated.

This invention is an improvement over our pending application, Serial No. 308,620, filed December 11, 1939, for a similar device.

It is the principal object of the present invention to provide a speed and braking distance indicator in combination with a magnet speedometer having a magnet rotor shaft and a drag element shaft, whereby a current speed indicating hand is operated, and means manually operable to simultaneously set said indicating hand and make operative a braking distance indicator driven by said magnet rotor shaft.

Another object of the present invention is the provision of an instrument having means for indicating the current ground speed of the automobile, which means is secured in its current position as other means to indicate the braking distance is manually made operative.

A further object of this invention is the provision of a speed and braking distance indicator for automobiles having a magnet driving shaft responsive to the ground speed of the automobile, a drag unit driven by said magnet to indicate the current speed of the automobile, means driven by said magnet driving shaft to indicate the braking distance of the automobile, and manually operable means adapted to cause the simultaneous securing of said drag unit to indicate the current speed of the automobile and set in motion said braking distance means.

Other objects are simplicity and economy of construction, accuracy and dependability of operation, and adaptability for use with the various types of speedometer structures now in general use.

With these objects as well as others which will appear during the course of the specification in view, reference will now be had to the drawings wherein:

Fig. 5 is a rear elevation of the working mechanism of the device.

Fig. 6 is a view similar to that shown in Fig. 5, with some of the parts omitted and other parts moved to the operative position to secure the speed indicating hand and move the braking distance indicator.

Fig. 7 is an enlarged view of certain of the operating parts and their supporting means; and Fig. 8 is a sectional view of the frictional drive unit taken on line VIII—VIII of Fig. 3.

Figure 1:
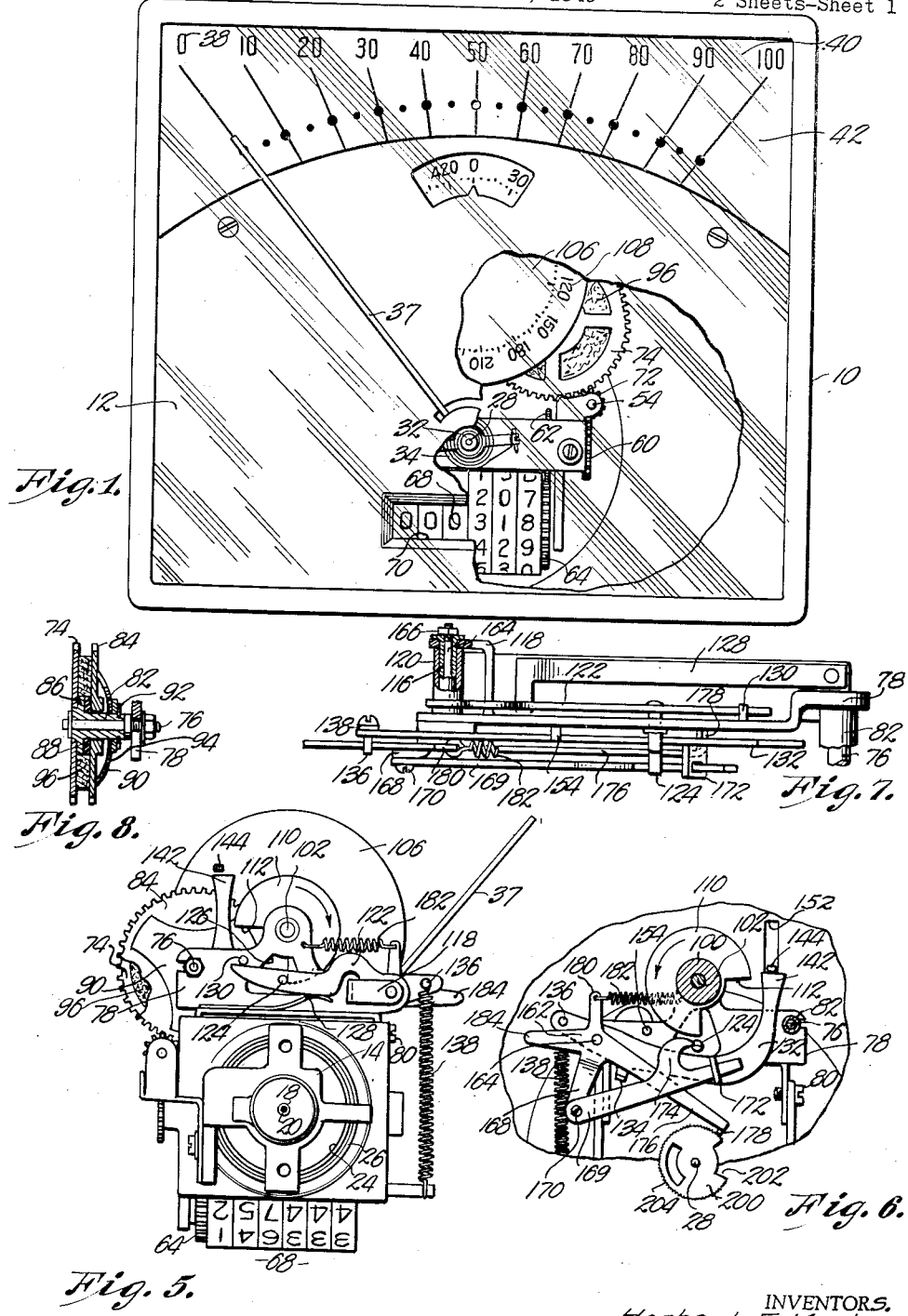
Figure 1 is a front elevation, partly broken away, of a speed and braking distance indicator embodying this invention.
Figure 2:
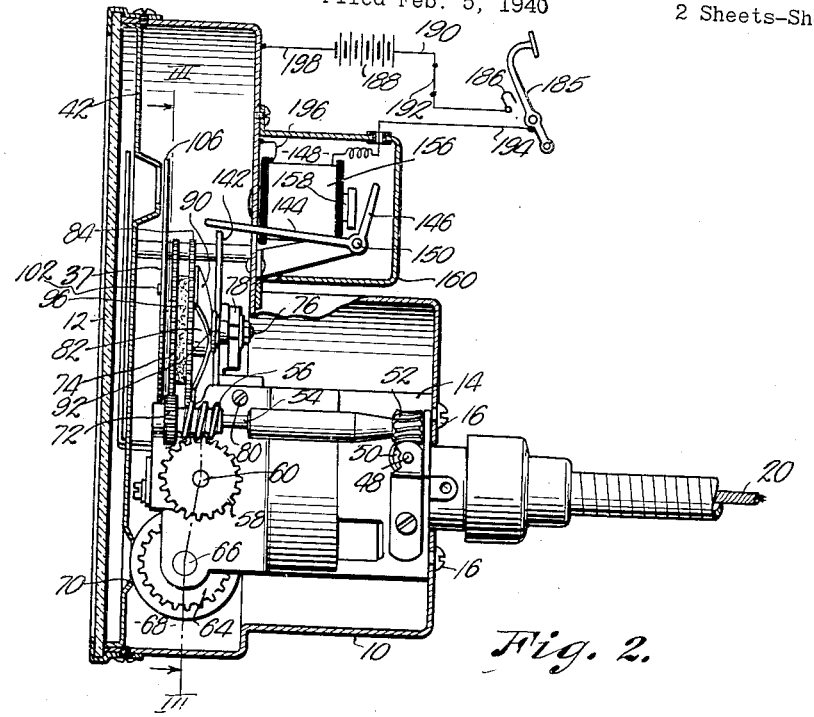
Fig. 2 is a side elevation of the working parts of the instrument, shown in Fig. 1, with the housings shown in section.

Throughout the several views, like reference characters refer to similar parts and the numeral 10 is a housing open at one side and provided with a transparent cover member 12, through which the operator may observe the speed and braking distance indications hereinafter described.

An irregular frame member 14 is secured within housing 10 by means of screws 16. Substantially centrally mounted in frame 14 is a shaft 18 which is adapted to be rotated by means of a flexible shaft 20, which in turn is rotated by means (not shown) at a speed proportionate to the ground speed of the automobile.

To the inner end of shaft 18 is securely mounted for rotation therewith, a permanent magnet 22. This magnet is mounted with the drag or speed cup 24 which is concentrically positioned within the stationary field cup 26 and concentrically with shaft 18. Drag cup 24 is mounted on shaft 28, which in turn is mounted in axial alignment with shaft 18 in bearings 30 and 32. This shaft 28 is provided with a hair spring 34 which limits its rotary movement and also is provided with an offset drag cup arm 36, which is forced by the hair spring to engage the bearing member 30 to cause the shaft to normally rest at a fixed starting point with hand 37 registering with the zero 38 on the series of indicia 40, inscribed on the dial 42 mounted in housing 10 adjacent the transparent member 12.

To shaft 18 is rigidly attached a worm 44, which intermeshes with a worm gear 46 mounted for rotation with transverse shaft 48, mounted in frame 10. Shaft 48 is also provided with a worm 50 which intermeshes with worm wheel 52 to drive shaft 54, which is rotatably mounted in frame 10 in parallel relation with shaft 18. This shaft 54 is provided adjacent its end with a worm 56, which intermeshes with worm gear 58 mounted on transverse shaft 60, which is journaled in frame 18 in parallel relation with shaft 48.

The usual cumulative indicating of the total miles traveled is provided for as follows:

The shaft 60 is provided at its inner end with a rigidly attached spur gear 62 which intermeshes with a spur gear 64, which is rigidly attached to shaft 66 of the cumulator 68, so that as shaft 18 is rotated, the cumulator will be operated to indicate the total number of miles traveled through the window 70 formed through dial 42.

The foregoing description is of the ordinary speedometer now in general use, and it is with this mechanism that various parts have been associated to produce the improved device constituting this invention.

It is one of the primary objects of this invention to provide means whereby the distance required to stop the automobile by means of its brakes is indicated on a visible indicator and for this purpose the following mechanism is provided:

The shaft 54 which is driven in direct ratio to the ground speed of the automobile is provided with a rigidly attached spur pinion 72 which intermeshes with a spur gear 74 mounted on the stationary stub shaft 76, carried by auxiliary frame 78 secured to frame 14 by means of screws 80. Spur gear 74 is provided with an elongated hub 82 on which is mounted frictionally driven spur gear 84.

Referring to Fig. 8, it will be noted that the spur gear 84 is spaced apart from the enlarged hub portion 86 of gear 74 by a fiber washer 88. This desired friction between these parts is obtained by means of the spider spring 90 mounted on hub 82 and held in position by the split washer 92 with its radial spring arm 94 resting against gear 84. This frictionally driven gear 84 makes it possible to permit the speedometer to register in the usual manner while the braking distance indicator is at rest, also it maintains proper relation of the different members of the train of gears as hereinafter described.

A felt lubricating ring 96 positioned between gears 74 and 84 and resting on hub 86 and washer 88, serves to provide proper lubrication of the parts.

A pinion 98 having a hub 100 extending outwardly from both sides thereof is mounted on a stub shaft 102 carried by auxiliary frame 78. The pinion is secured against axial movement on shaft 102 by split washer 104. The forward portion of hub 100 is provided with a disc 106 having a series of indicia 108 inscribed thereon to indicate the number of feet required to stop the automobile by means of the brakes.

The rear portiton of hub 100 is provided with concentrically disposed disc 110 having a notch 112 formed in its periphery. Both discs 106 and 110 are driven by friction gear 84 through pinion 98.

A hollow shaft 116 is pivotally mounted in auxiliary frame 78 and bearing 118 extends in front and to the rear of frame 78 and carries at its rear portion, a sleeve 120 to which is rigidly secured a radially disposed arm 122 which carries a transversely disposed pin 124, which extends through an opening 126 formed through frame 78 and is adapted to normally enter the notch 112 in disc 110 to prevent its rotation as the automobile is traveling and the brakes are not being set. The arm 122 is constantly urged to the raised position by spring 128 to rest against stop pin 130. An angled lever arm 132 rigidly secured to the forward end of hollow shaft 116, extends across the front of frame 78 and is provided with a transverse stop member 134. The one end of lever arm 132 extends outwardly beyond shaft 116 and is provided with a pin 136 to which is attached one end of a coil spring 138. The other end of the spring is secured to a pin 140 mounted in frame 14. This spring serves to constantly urge the angled end 142 of arm 132 upwardly against the arm 144 of armature 146 of electro-magnet 148. The armature 146 is pivoted for rotation at 150 and is limited in its rocking movement by stop 152. A pin 154 mounted in auxiliary frame 78 in the path of travel of arm 132 serves to limit its upward movement. The armature coil 156 is mounted on the core 158 and the entire armature which is disposed outside the housing 10, is covered by a housing 160. A multiple lever member 162 axially secured to a shaft 164 is positioned in front of lever arm 132 with its affixed shaft extending through hollow shaft 116 and its free end threaded and provided with a nut 166, whereby it is secured against longitudinal movement in the hollow shaft. The depending arm 168 of member 162 serves to carry one end of an arm 169 which is pivoted thereto at 170. The other end of arm 169 is slidably mounted in a slotted ear 172, carried by lever arm 132 adjacent its angled portion. The upper portion of arm 169 is provided with an overhanging tongue 174 which is adapted to engage and move pin 124 at certain times as hereinafter set forth.

A disc 200 frictionally mounted for axial adjustment on shaft 28, is notched at 202 and is provided with fine peripheral teeth 204.

Since it is desirable to maintain the disc 106 at the starting point when the automobile is traveling at a speed below a predetermined rate and to secure the speed indicating hand at any current speed above said predetermined rate at the start of the braking operation, the following mechanism is provided:

The multiple lever 162 is provided with an arm 176 having a transversely disposed end portion or detent 178 which is adapted to oscillate in and out of notch 202 formed in disc 200 and to also, at certain times, engage between teeth 204 to secure the indicator hand 37 in the current speed indicating position. A substantially vertically disposed arm 180 integral with lever 162 serves as a support for one end of spring 182, while the other end is secured to frame 78. This spring serves to normally force the tongue 184 of lever 162 against the protruding end of pin 136, thus holding detent 178 out of the path of travel of disc 200 (see Fig. 3), wherein the parts are shown in their normal position. It is the object of this invention to set the braking distance mechanism in motion and to simultaneously secure the hand 37 at the current speed as the operator sets the brake lever 185.

As the brake lever is depressed, it will contact the spring arm 186 and connect the battery 188 through wire 190, switch 192, lever 185, wire 194 to magnet coil 156, thence to ground wire 196, frame 14 and battery ground wire 198.

Figures 3, 4:
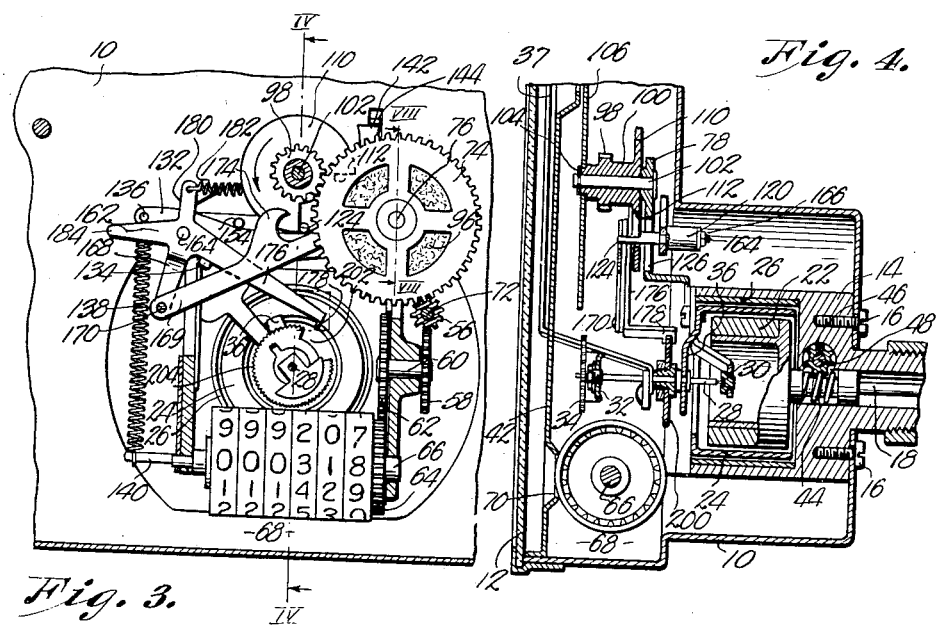
Fig. 3 is a fragmentary sectional view taken on line III—III of Fig. 2.
Fig. 4 is a vertical section taken on line IV—IV of Fig. 3.

The operation of the device is as follows:

An arbitrary speed of twenty-five miles will be considered as the speed above which the braking distance mechanism will operate. Below this predetermined speed the braking distance mechanism will not operate for the following reasons:

When the brake lever 134 is operated, current will be supplied to electro-magnet 158 so that armature arm 144 will force lever arm 132 downwardly, and because of the relation of the multiple lever 162 thereto, they will maintain a fixed relation and the end portion 178 of arm 176 will enter the notch 202 formed in the periphery of disc 200. It will be noted notch 202 is relatively long to preclude the operation of the braking distance indicator, while the automobile is traveling at a rate less than twenty five miles per hour. The predetermined rate of travel is determined by the normal distance of arm portion 178 from the rear side of notch 202. This distance may be varied by simply adjusting disc 200 on shaft 28. When the brake is set while the automobile is traveling at a speed below twenty-five miles per hour, member 178 will enter notch 202 but will not contact disc 200. Referring to Fig. 3, it will be noted that when the parts are oscillated as just described, the tongue 174 will move through an arc to just miss pin 124, thus maintaining the disc 110 in the secured position.

When the automobile is traveling at a speed above the twenty-five miles per hour limit, the disc 200 will be in a position indicated in Fig. 6, with notch 202 out of the path of travel of detent member 178 so that as the brake lever 185 is set and lever arm 132 is depressed, detent 178 will rest in between two of teeth 204 to secure the disc in its current position.

After detent 178 engages disc 200 lever 132 will continue its downward movement, thereby causing a relative movement between lever 132 and the multiple lever 162, thus moving tongue 174 outwardly to engage pin 124 to release disc 110 and permit the braking distance indicating disc 106 to be rotated to indicate the actual distance travelled by the automobile after the brake was set. After pin 124 has been disengaged from notch 112, disc 110 will continue to make a full revolution before the pin will again be positioned to stop its rotation. As long as the brake lever is depressed and during the time that pin 124 rides on the periphery of disc 110, the indicator hand 37 will be held secure so that when the automobile stops, the operator may look at hand 37 to get the rate of speed of travel of the automobile at the time the brake was set and disc 106 will have rotated to indicate the braking distance required to stop the car.

When pin 124 is riding against the periphery of disc 110, the lower part of pin 124 will engage the upper part of lever 132 to limit the upward movement thereof so that the stop member 134 will not engage and lift arm 176, thus permitting the detent to continue its operative engagement with disc 200 until the disc rotates far enough to permit pin 124 to move into notch 112, then stop member 134 will engage and lift arm 176 out of operative engagement with disc 200 so that the indicating arm 37 may move to indicate the current speed of the automobile.

It is apparent that this same general mechanism could be slightly altered to work in conjunction with the various types of speedometers now in general use without departing from the spirit of the invention. It is also apparent that the only requirement for the speedometer is that it has a shaft responsive to the ground speed of the automobile and a drag unit to operate means to indicate the current speed of the car. While a magnet means has been shown to operate the braking distance and to secure the speed indicating means, yet it is very evident that a mechanical or pneumatic connection might be substituted therefor to operatively interconnect the device with the brake lever.

Having thus described the invention, what is claimed as new and desired to be secured by Letters Patent is:

1. In a speed and braking distance indicator for automobiles the combination with a speedometer having a magnet driving shaft operated in direct ratio to the ground speed of the automobile and a magnetically driven drag unit operable to indicate the current speed of the automobile, of means driven by said magnet driving shaft to indicate the braking distance and means operable to secure said drag unit in the current position, and manually operable means to simultaneously make operable said securing means and to set in motion said distance indicating means.

2. In a speed and braking distance indicator for automobiles the combination with a speedometer having a magnet driving shaft responsive to the ground speed of the automobile and a drag unit driven by said driven magnet to indicate the current speed of said automobile, of means operable by said magnet driving shaft to indicate the braking distance of said automobile, and means operable to simultaneously secure said drag unit at its then current position and to make operative said braking distance means.

3. In a speed and braking distance indicator for automobiles, a shaft driven proportionately to the ground speed of the automobile, a magnet carried for rotation by said shaft, a drag unit driven by said magnet to indicate the current speed of said automobile; a braking distance indicating means operable by said shaft through a friction clutch; means to secure said drag unit in the current position; and manually controlled means operable to simultaneously cause said last named means to operate to secure said drag unit and to set in motion said clutch and braking distance indicating means.

4. A speed and braking distance indicator for automobiles comprising a shaft driven at a speed responsive to the ground speed of the automobile, a magnet carried by and rotatable with said shaft, a drag unit driven by said magnet to indicate the current speed of said automobile, a braking distance indicating means operable by said shaft through a clutch, and a manually controlled means operable to simultaneously set said clutch and secure said drag unit to indicate the then current speed of the automobile.

5. A speed and braking distance indicator for automobiles comprising a rotatably mounted shaft driven at a speed responsive to the ground speed of the automobile, a permanent magnet rotated by said shaft, a drag unit including a drag cup driven by said rotated magnet to indicate the current speed of the automobile; a braking distance indicating means operable by said shaft through a clutch, a manually controlled means operable to simultaneously set said clutch and secure said drag cup to indicate the then current speed of the automobile, and means to automatically maintain said clutch and drag unit securing means in said set positions for a predetermined distance of automobile travel.

6. A speed and braking distance indicator for automobiles comprising a rotatably mounted shaft driven at a speed responsive to the ground speed of the automobile; a permanent magnet rotatable with said shaft, a drag cup driven by said magnet to indicate the current ground speed of the automobile, a braking distance indicating means adapted to be operated by said driven shaft through a friction drive coupling, means to prevent operation of said drive coupling when the automobile is travelling below a predetermined ground speed, and manually operable means adapted to simultaneously operate said last named means and to secure said drag cup in the then current position to indicate the current speed of travel of the automobile when the ground speed of the automobile is above said predetermined ground speed.

7. A speed and braking distance indicator for automobiles comprising a rotatably mounted shaft driven at a speed responsive to the ground speed of the automobile, a magnet rotatable with said shaft, a drag cup having an indicating hand driven by said magnet to indicate the current ground speed of the automobile, a braking distance indicating means adapted to be driven by said shaft through a friction clutch, means to prevent operation of said friction clutch when the ground speed of the automobile is below a predetermined speed, and means to make operable said friction clutch when the speed of the automobile is above said predetermined speed.

8. A speed and braking distance indicator for automobiles comprising a rotatably mounted shaft responsive to the speed of the vehicle, a magnet rotatable with said shaft, a drag cup driven by said magnet rotatable with said shaft to indicate the current speed of the vehicle, a braking distance indicating means adapted to be driven by said shaft through means including a friction clutch, means to cause said clutch to slip and prevent operation thereof when the speed of said automobile is below a predetermined rate, and means to make inoperative said last named means when the speed of the automobile is above said predetermined rate.

9. A speed and braking distance indicator for automobiles comprising a rotatably mounted shaft responsive to the speed of the vehicle, a magnet rotatable with said shaft, a drag cup responsive to the speed of rotation of said magnet to indicate the current speed of travel of the vehicle, a braking distance indicating means including clutch means adapted to be driven by said shaft only when said shaft has attained a speed of rotation above a predetermined rate, and manually operable means adapted to simultaneously secure said drag cup to indicate the then current speed of the vehicle and to operate said clutch means whereby the braking distance means is set in motion.

10. A speed and braking distance indicator for automobiles comprising a rotatably mounted shaft responsive to the speed of the automobile, a magnet rotatable with said shaft, a drag cup, mounted on a shaft, responsive to the speed of rotation of said magnet to indicate the current speed of travel of the automobile, a braking distance indicating means including a friction drive member driven by said rotatably mounted shaft, means for securing said friction drive member against operation, means to release said securing means to permit driving of said indicating means when said rotatably mounted shaft has attained a predetermined speed of rotation, and manually operable means including said last named means adapted to simultaneously secure said drag cup against movement to indicate the then current speed of the automobile during a predetermined distance of travel of the automobile and to release said friction drive member to start the operation of said braking distance means.

HERBERT F. MORLEY.
ROY E. GEARHART.